United States Patent
Sivaganesh et al.

(10) Patent No.: US 10,206,098 B2
(45) Date of Patent: Feb. 12, 2019

(54) SYSTEM AND METHODS OF TRANSACTION ORIGINATOR IDENTIFIER FOR ON-LINE COMMERCIAL TRANSACTION

(71) Applicant: Cellco Partnership, Basking Ridge, NJ (US)

(72) Inventors: Nash Sivaganesh, Belle Mead, NJ (US); Sankar Shanmugam, Dayton, NJ (US); Moorthy Sengottaiyan, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 895 days.

(21) Appl. No.: 14/149,314

(22) Filed: Jan. 7, 2014

(65) Prior Publication Data

US 2015/0195707 A1    Jul. 9, 2015

(51) Int. Cl.
*H04L 29/06* (2006.01)
*H04W 12/04* (2009.01)
*H04L 9/32* (2006.01)

(52) U.S. Cl.
CPC .......... *H04W 12/04* (2013.01); *H04L 9/3242* (2013.01); *G06Q 2220/10* (2013.01); *H04L 2209/56* (2013.01); *H04L 2209/80* (2013.01)

(58) Field of Classification Search
CPC ..... H04W 12/04; H04W 12/00; H04W 12/08; H04L 9/3242; H04L 2209/56; H04L 2209/76; H04L 2209/80; H04L 9/32; G06Q 2220/10; G06Q 2220/00
See application file for complete search history.

(56) References Cited

U.S. PATENT DOCUMENTS

| 8,442,858 | B1 * | 5/2013 | Barnes | G06Q 30/02 705/14.4 |
| 2002/0191795 | A1 * | 12/2002 | Wills | H04L 63/0281 380/270 |
| 2008/0046366 | A1 * | 2/2008 | Bemmel | G06Q 20/20 705/44 |
| 2008/0130898 | A1 * | 6/2008 | Holtmanns | H04L 63/0823 380/278 |
| 2012/0095905 | A1 * | 4/2012 | Hodges | G06Q 20/027 705/39 |
| 2012/0150742 | A1 * | 6/2012 | Poon | G06Q 20/20 705/44 |

(Continued)

*Primary Examiner* — Trong H Nguyen
*Assistant Examiner* — Amie C. Lin

(57) ABSTRACT

A packet gateway in a mobile network generates a unique identifier related to a mobile device owner and inserts the unique identifier into a data request. A merchant website receives and forwards the unique identifier to a customer information mediation server. The customer information mediation server utilizes the unique identifier to retrieve information related to the mobile device owner and provides the retrieved information to the merchant website. The merchant website, in turn, provides portions of the retrieved information to the mobile device as part of the response to the data request. The provided portions of the retrieved information may be included as pre-populated fields, for example in a check-out form of a web page. The mobile device owner may then complete the check-out or other transaction without entering any, or entering only limited, information related to the owner.

20 Claims, 4 Drawing Sheets

(56) References Cited

U.S. PATENT DOCUMENTS

| | | | |
|---|---|---|---|
| 2013/0170643 A1* | 7/2013 | Xiao | H04L 63/08 380/270 |
| 2015/0052036 A1* | 2/2015 | Vernal | G06Q 40/00 705/35 |

* cited by examiner

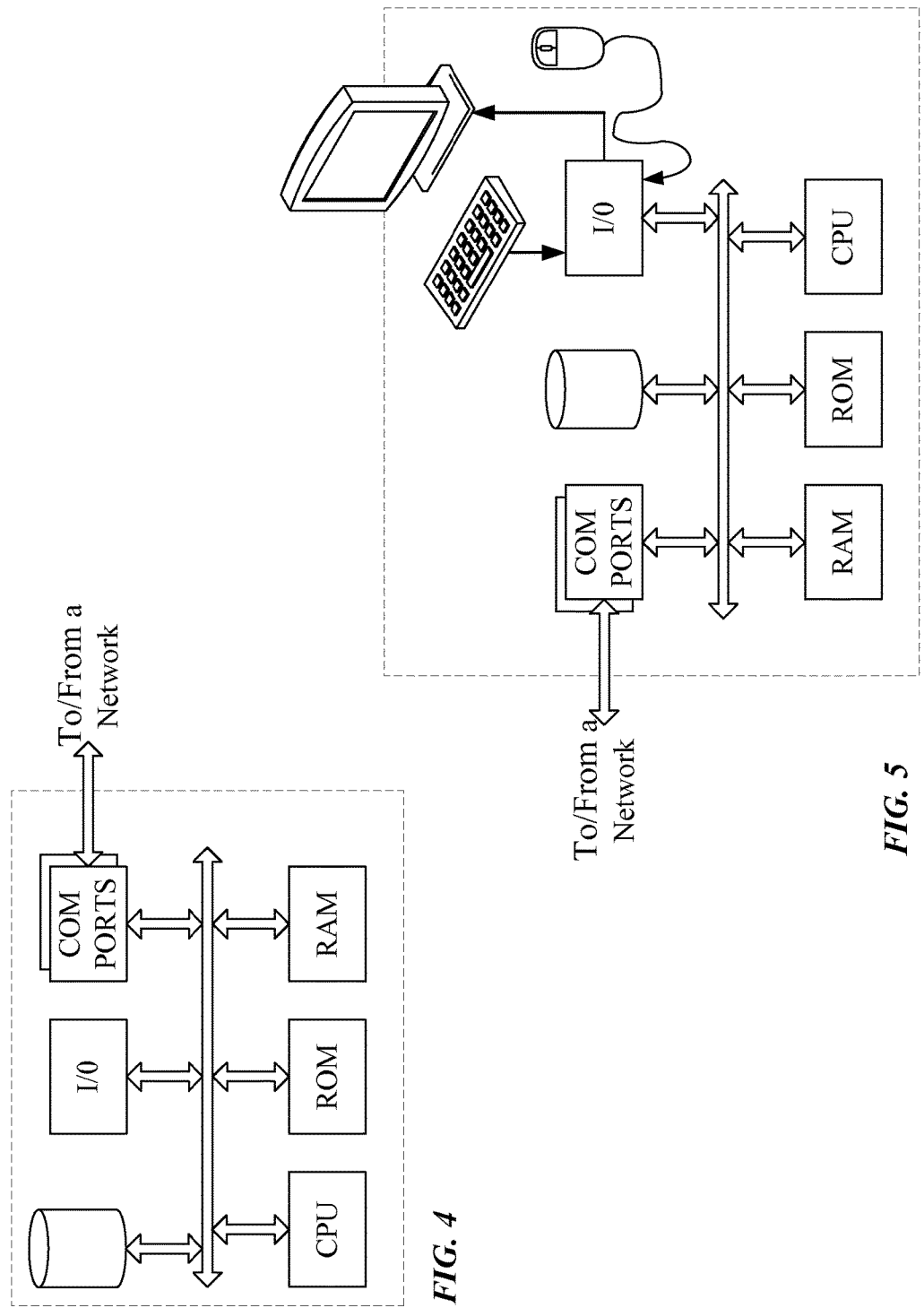

SYSTEM AND METHODS OF TRANSACTION ORIGINATOR IDENTIFIER FOR ON-LINE COMMERCIAL TRANSACTION

BACKGROUND

Traditional e-commerce on the Internet involves selecting one or more items of merchandise from a vendor's website, for example adding the merchandise to a virtual shopping cart. Once a buyer has completed the selection process, a check-out process is performed. As part of the check-out process, the buyer provides a first and last name, shipping address, billing address, and billable financial account information (e.g., credit card/debit card account number, expiration data and security code). If the user has established an account with the merchant website, in which case, the user may have provided some or all of the personal information previously. Otherwise, the user must input the required account information each time on each website as part of the check-out process. When performed via a typical computer or laptop with a physical keyboard and mouse, the data entry may be relatively easy, although input errors do occur.

In recent years, availability of mobile devices, such as smartphones and tablets, have driven the growth of e-commerce. Although websites have been modified to better display on relatively smaller screens of mobile devices, account set-up and/or the check-out process still require the buyer to enter the necessary information to complete the purchase. On a mobile device, such data entry, often with a "virtual" keyboard, can be very difficult and/or prone to errors.

Hence a need exists for simplifying personal data entry for e-commerce, for example, by securely pre-populating the necessary information so that the buyer may complete the process without difficult data entry.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 provides a block diagram of a general purpose computer hardware platform that may be configured as a host or server, for example, to function as any of the server computers shown in FIGS. 1 and 2.

FIG. 5 is a simplified functional block diagram of a personal computer or other work station or terminal device.

DETAILED DESCRIPTION OF EXAMPLES

Figure 1:
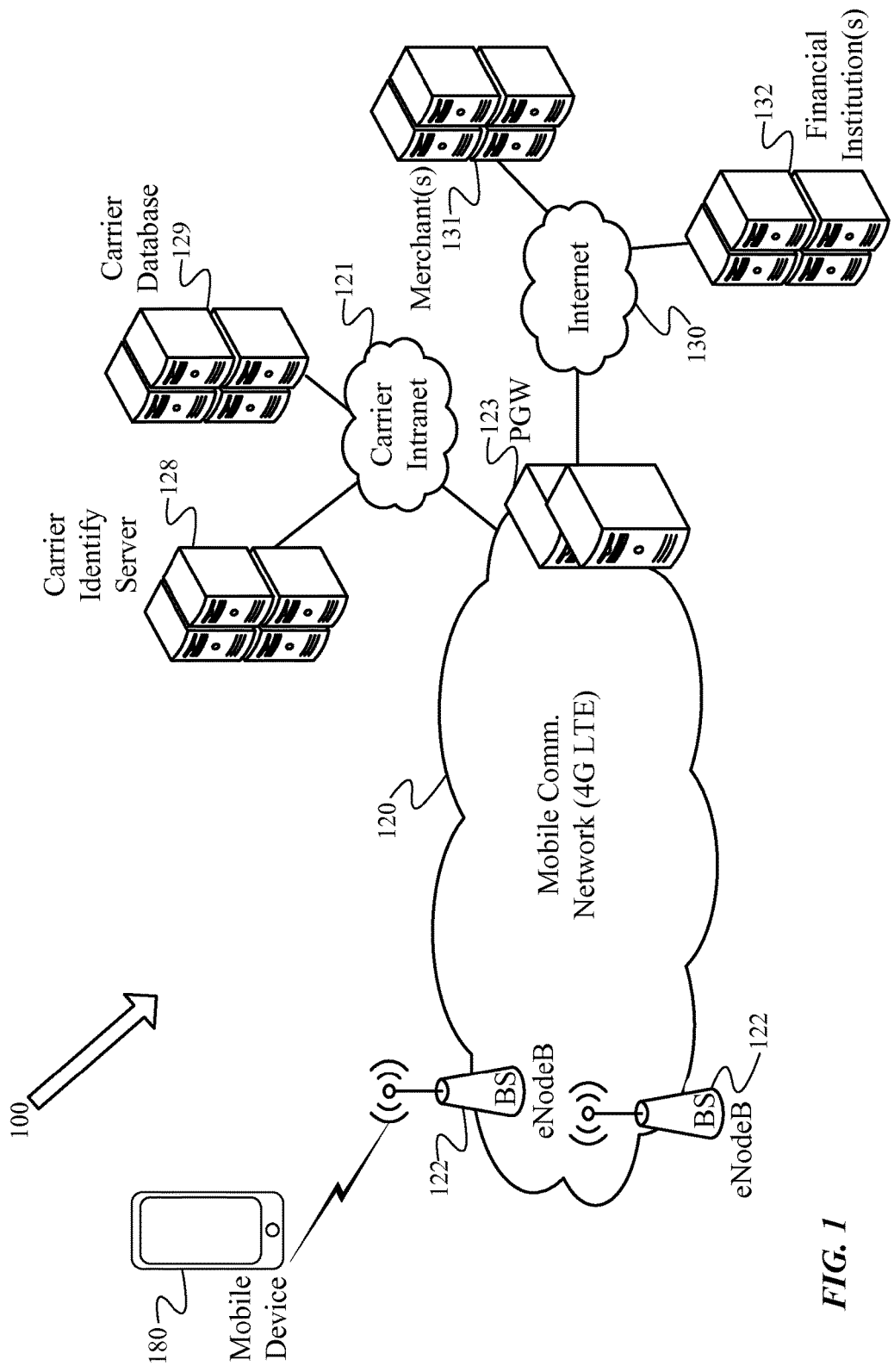
FIG. 1 is a functional block diagram of an example of a system which may implement a method for identifying a transaction originator and providing relevant information in a payment solution.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to a method and a system for identifying a transaction originator in an on-line commercial transaction. Relevant data for the originator may then be automatically populated to assist in completion of an e-commerce transaction.

In various examples, the method and system is specific to a fourth-generation (4G) Long Term Evolution (LTE) mobile communication network. In a legacy third generation (3G) mobile communication network, an authorization, authentication, and accounting (AAA) function provides a mapping between the mobile directory number (MDN) of a mobile device and the Internet Protocol (IP) address currently assigned to the device. In a 4G LTE network, the IP address viewed by a packet gateway (PGW) between the 4G LTE network and an outside network, such as the Internet, has likely been translated from the original IP address assigned to the mobile device. Thus, the PGW is unable to reliably identify an MDN of the mobile device based on an IP address contained in the IP packet. Therefore, a solution is needed to allow the source of an IP packet to be identified to support transactions initiated via a mobile device.

A PGW within a 4G LTE mobile communication network generates a unique identifier related to an owner of a mobile device and inserts the unique identifier into a data request intended for a merchant website. The merchant website then forwards the unique identifier to a customer information mediation server of the mobile communication network operator. The customer information mediation server utilizes the unique identifier to retrieve information related to the owner of the mobile device. The customer information mediation server provides the retrieved information related to the mobile device owner to the merchant website and the merchant website may, in turn, provide portions of the retrieved information to the mobile device. The provided portions of the retrieved information are included as pre-populated fields in a check-out form of a web page, without requiring the owner of the mobile device to log into the merchant website and without utilizing the cache of the web browser. The owner of the mobile device may then complete the check-out without entering any, or entering only limited, information related to the owner. Although the examples refer to a check-out and/or order completion process and webpage, this is only for simplicity. The transaction originator identification process may be used as part of other activities, such as account set-up and/or other identity verification procedures. Furthermore, the various examples refer to an owner of the mobile device, and it should be understood that typically the information provided will be that of the holder of the account to which the mobile device belongs (e.g., parent account holder of shared family plan to which a child phone belongs). It is also envisioned that, in various examples, the information provided is specific to the individual currently utilizing the mobile device.

In an example, an owner of a mobile device has selected one or more items for purchase from a merchant website and the owner desires to complete the purchase. The mobile device, in this example, is connected to the merchant website via a mobile communication network, e.g. a 4G LTE network. The mobile device owner starts a check-out process by selecting a "check-out" or other similarly labeled button or link from a web page or otherwise indicating a desire to complete the purchase. Upon the owner selecting "check-out", a data request is sent from the mobile device to the merchant website via the mobile communication network. The data request is, for example, an HTTP request.

A PGW of the mobile communication network receives the data request from the mobile device and the PGW determines a mobile subscriber account record identifier related to the owner of the mobile device. The PGW queries a database of the mobile communication network operator with the mobile subscriber account record identifier for an encryption key related to the account record identifier. The database, in this example, is an encryption key database. The encryption key database responds to the query with the encryption key related to the mobile subscriber account record identifier. The PGW generates a unique identifier related to the mobile device by creating a keyed-hash message authentication code (HMAC) of the mobile subscriber account record identifier with the encryption key. The PGW inserts the unique identifier into a header field of the data request (e.g., an HTTP header field of the HTTP request) and forwards the data request, with the unique identifier, to the merchant website.

Upon receiving the data request, with the unique identifier, from the PGW, the merchant website extracts the unique identifier from the header field of the data request. The merchant website, in order to retrieve the necessary information related to the mobile device owner to pre-populate fields within a check-out web page, forwards the unique identifier to a customer information mediation server of the mobile communication network operator.

The customer information mediation server queries a unique ID database of the mobile communication network operator with the unique identifier for the mobile subscriber account record identifier related to the owner of the mobile device. The unique ID database validates the unique identifier and responds to the query, if the validation is successful, with the mobile subscriber account record identifier. The customer information mediation server then queries a customer account record database, of the mobile communication network operator, with the mobile subscriber account record identifier, asking for information related to the owner of the mobile device. The customer account record database finds the mobile subscriber account record based on the mobile subscriber account record identifier and responds to the query with information from the account record for the owner of the mobile device. In this example, the information includes one or more of: a first and last name of the owner of the mobile device, a street address of the owner, a phone number of the owner and/or the last four digits of the social security number of the owner.

In some examples, the customer information mediation server also queries one or more financial institutions with the mobile subscriber account record identifier for billable financial account information related to the owner of the mobile device. The billable financial account information may be, for example, an account number (e.g. credit or debit card account number), account number expiration data, and/or account type data.

After receiving the information related to the owner of the mobile device and, optionally, the billable financial account information, the customer information mediation server provides this information to the merchant website. The merchant website, in turn, utilizes a portion of the information to pre-populate fields in the check-out web page and the merchant website provides the check-out web page through the mobile device to the user for review. For example, the merchant website includes the mobile device owner's name, address, and phone number in the web page as well as the mobile device owner's billable financial account number, with all but the last four digits of the account number masked by asterisks. In this way, the owner of the mobile device need only confirm the information pre-populated in the fields of the check-out web page and complete the order by selecting a "complete order" or other similarly labeled button or link, without requiring the owner of the mobile device to log into the merchant website and without utilizing the cache of the web browser.

Reference now is made in detail to the examples illustrated in the accompanying drawings and discussed below. FIG. 1 illustrates a functional block diagram of an example of a system 100 that supports various mobile communication services and which may implement a method for identifying a transaction originator in a payment solution.

The illustrated system 100 services any number of mobile devices, including the illustrated mobile device 180. Mobile device 180 may be a laptop, a personal digital assistant ("PDA"), a smartphone, a tablet PC or another portable device designed to communicate via a wireless network. The mobile device 180 in our example corresponds to a smartphone or tablet itself having network communication capability and a user interface, which in this discussion, may be used in the transaction originator identification procedures.

The illustrated system example includes a mobile communication network 120, in this case, operated in accordance with 4G LTE standards. Mobile network 120 may provide mobile telephone communications as well as Internet data communication services. For example, mobile network 120 may connect to public packet-switched data communication networks such as the Internet 130 via PGW 123. Data communications via mobile network 120 provided for users of devices like 180 may support a variety of services such as communications of text and multimedia messages, e-mail, web browsing, streaming or downloading content, etc. with network connected equipment represented generically by the merchant(s) 131 and/or the financial institution(s) 132 in the drawing. Voice communication also may involve transport via the Internet 130 using voice over Internet Protocol (VoIP) technologies. Mobile device 180 may connect to mobile network 120 through a cellular base station 122, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 120 will also utilize a variety of other systems for related purposes, such as maintenance, accounting and provisioning. In the example, the carrier has another data network, e.g. Intranet 121, that provides data communications for other data systems used by the carrier; and that network 121 has connectivity into the network 120 that provides the actual communications services to the carrier's customers. For purposes of the present discussion, equipment communicating via the network 121 includes a carrier identify server 128 as well as a carrier database 129 that will be involved in the identification of a transaction originator in the payment solution. The carrier database 129 is, for example, a database management system and stores a number of individual databases, as described further below in relation to FIG. 2.

Figure 2:
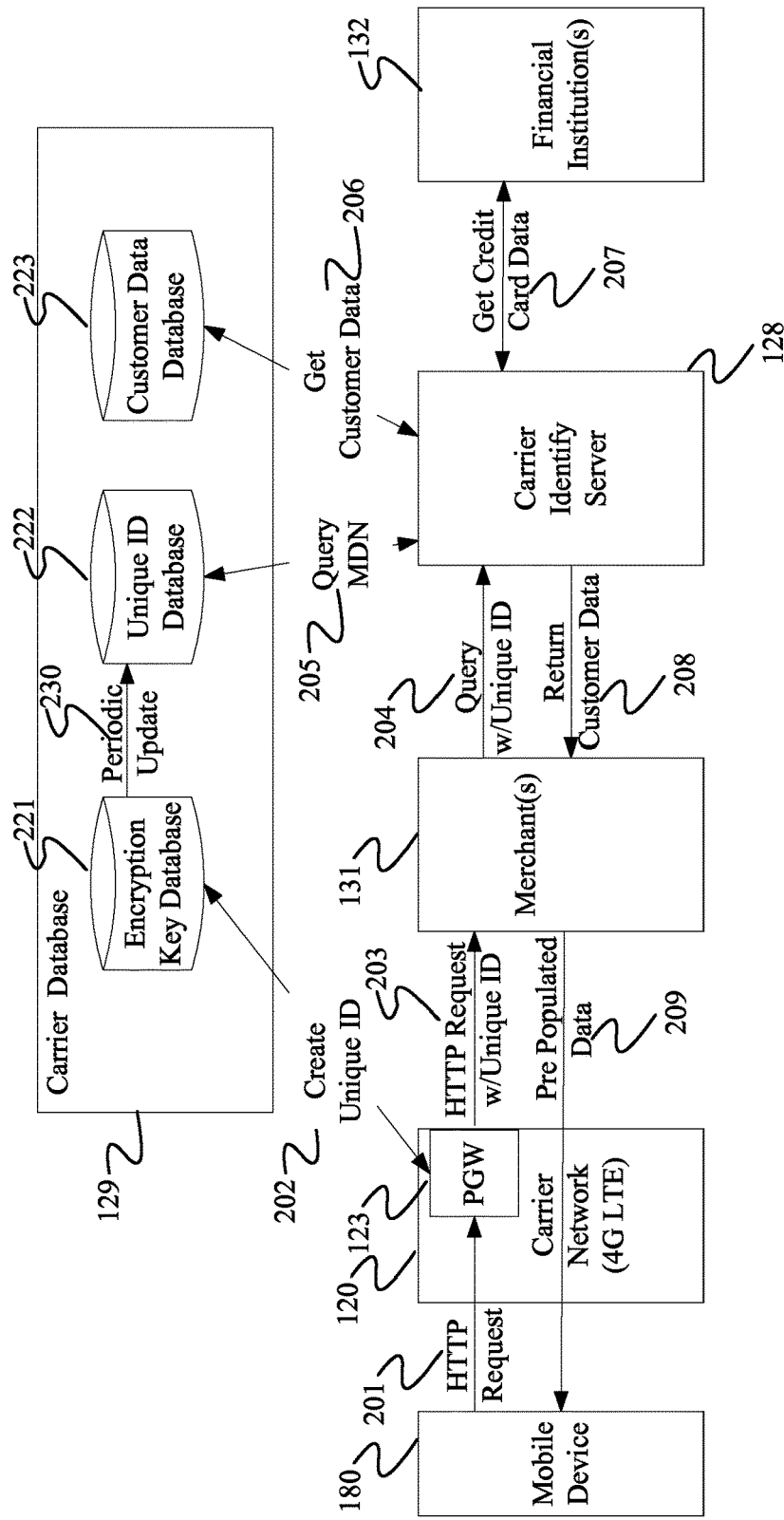
FIG. 2 provides a block diagram illustration of another example of the system of FIG. 1, but showing a different set of the elements that may be involved in the payment solution.

FIG. 2 provides a somewhat different block diagram that illustrates the system 100, by way of example, but showing examples of more elements of the system 100 that may be involved in identifying a transaction originator in the payment solution. The drawing shows the mobile device 180, mobile communication network 120, PGW 123, merchant(s) 131, carrier identify server 128, financial institution(s) 132 and carrier database 129 from FIG. 1 in a different format, but omits other general elements (such as base stations 122, Internet 130, and carrier intranet 121). The drawing further depicts, in greater detail and as further described below, elements within carrier database 129 as well as various flows between the various elements.

Encryption key database 221 stores records with each record containing a mobile subscriber account record identifier and a corresponding encryption key. Unique ID database 222 stores records with each record containing a unique ID and a corresponding mobile subscriber account record identifier. Customer account record database 223 stores records with each record containing a mobile subscriber account record identifier and corresponding customer information (e.g., full name, address, phone number, etc. for the account holder).

In one example, customer record database 223 is the entire customer database of the carrier (e.g., carrier billing system). Alternatively, customer record database 223 may be a specialized database established with a subset of data for each of some of the carrier's customers. The carrier's customers may, in the examples, opt-in and/or opt-out to have their customer information available for use in the transaction originator identification process. Such opt-in and/or opt-out may be a blanket selection for any or all transactions for any or all merchants, may be selective per type of transaction (e.g., purchase, account set-up, and/or identity verification), and/or may be selective per merchant, either as a type of merchant (e.g., grocer, restaurant, retail, etc.) or a specific merchant. Such selection may further be made initially for all occurrences, and subsequently changed, or a mobile device owner may be prompted to make a selection during each occurrence.

The various flows in the process of identifying a transaction originator will now be described, by way of example. In one example, a mobile device 180 submits, at 201, an HTTP request directed to a merchant server 131. The PGW 123, in this example, intercepts the HTTP request and, as part of step 202, requests an encryption key from encryption key database 221.

The encryption key request, for example, includes a mobile subscriber account record identifier related to the owner of the mobile device 180. The mobile subscriber account record identifier may be a mobile directory number (MDN) or mobile telephone number (MTN) of the mobile device 180 or device identifiers such as international mobile equipment identifier (IMEI), international mobile subscriber identifier (IMSI), or integrated circuit card identifier (IC-CID). Although the mobile subscriber account record identifier may be any one and/or some combination of these identifiers, the examples, for simplicity, will refer to the MDN as the mobile subscriber account record identifier. The PGW 123 determines the MDN, for example, based on the HTTP request and/or from an existing connection between mobile device 180 and PGW 123 and/or mobile communication network 120.

The encryption key database 221, based on the MDN in the encryption key request, finds the corresponding record and returns an encryption key, for example, as part of step 202. The PGW 123 utilizes the returned encryption key to generate a unique ID related to the mobile device 180. For example, PGW 123 generates the unique ID by hashing the MDN with the returned encryption key. The PGW 123, in one example, generates a keyed-hash message authentication code (HMAC) of the MDN utilizing the returned encryption key.

In an alternative example, encryption key database 221 may utilize the encryption key to generate the unique ID, in which case encryption key database 221 returns the unique ID instead of the encryption key, as part of step 202. In this alternative example, encryption key database 221 generates the unique ID by hashing the MDN with the encryption key.

In step 203, the PGW 123 inserts the unique ID into a header field of the HTTP request (e.g., an HTTP header) and delivers the HTTP request with the unique ID to the merchant website 131. The merchant website 131, as part of step 204, extracts the unique ID from the HTTP request and queries a customer information mediation server. The customer information mediation server is, for example, carrier identify server 128.

The customer information mediation server (carrier identify server 128 in this example), as part of step 205, queries the unique ID database 222 to retrieve the corresponding MDN. The unique ID database, as part of step 205, validates the unique ID provided by the customer information mediation server and returns the corresponding MDN. In one example, unique ID database 222 utilizes the unique ID as an index into the database and unique ID database 222 validates the unique ID provided in the query from the carrier identify server 128 by determining if the provided unique ID matches a unique ID stored in the database. If a record with a matching unique ID is found, the provided unique ID is validated and unique ID database 222 returns the MDN from the record with a matching unique ID.

If a record with a matching unique ID is not found, the provided unique ID is not validated and the query fails. In such a situation, the carrier identify server 128 may pass a failure notice to the merchant website 131 without customer information for the subscriber. In response, the merchant website 131 could respond with a web page asking for manual user input of the requisite information in a traditional manner.

Upon receipt of the MDN from the unique ID database 222, the carrier identify server 128, as part of step 206, queries the customer account record database 223 for customer information related to the MDN. The customer account record database 223, as part of step 206, finds the record corresponding to the MDN and returns customer information to the carrier identify server 128. In one example, the returned customer information corresponds to the holder of the account associated with the MDN (e.g., parent account holder related to "child" phone on shared family plan). In an alternative example, customer account record database 223 includes individual customer information related specifically to the MDN and customer account record database 223 returns the MDN specific customer information (e.g., adult child owner of "child" phone on shared family plan).

Customer account record database 223, for example, returns a predefined set of information, e.g. everything within the corresponding account record or at least any and all name and/or address information within the corresponding account record. Alternatively, customer account record database 223 may provide only that information specifically requested. For example, merchant website 131 may only need an address for the mobile device owner, in which case merchant website 131 only requests address information for the mobile device owner and customer account record database 223 only provides the corresponding address information. In the examples, customer information includes a name of the owner of the mobile device 180, a street address of the owner, a phone number of the owner, and the last four digits of the social security number of the owner.

In an optional step 207, the carrier identify server 128 may also query one or more financial institution(s) 132 to retrieve billable financial account information related to the owner of the mobile device 180 for one or more billable financial account(s). The billable financial account is, for example, a credit card and/or a debit card. The billable financial account information, in the examples, includes a billable account number (e.g. credit/debit card number), a billable account expiry data (e.g. expiration month and year) and a billable account type data (e.g. MasterCard, Visa, American Express, etc.).

In one example, customer information contained in customer account record database 223 includes information for the one or more financial institution(s) 132 with which the mobile device owner has a relationship. Such financial institution information may be provided by the customer, e.g. at mobile account set-up and/or via a carrier provided customer care portal (not shown). The financial institution information may be the information necessary for carrier identify server 128 to complete the query (e.g., mobile device owner's credentials for the one or more financial institution(s) 132). Customer account record database 223, in this example, provides the information for the one or more financial institution(s) 132 to the carrier identify server 128, as part of step 206. The carrier identify server 128 then completes optional step 207 based on the information provided by customer account record database 223.

Alternatively to, and/or in addition to, optional step 207, customer account record database 223 may include billable financial account information for at least one billable financial account of the mobile device owner. In this case, the customer information provided by customer account record database 223 to the carrier identify server 128 in step 206 includes the billable financial account information for at least one billable financial account of the mobile device owner.

The carrier identify server 128, in step 208, returns the customer information and, optionally, billable financial account information for one or more billable financial account(s) to merchant website 131. Merchant website 131 generates a web page and, as part of step 209, delivers the web page to mobile device 180. In one example, the web page is a check-out or order confirmation page to complete an online purchase. The web page, for example, includes the necessary information (e.g., the information provided by the carrier identify server 128 based on the unique ID) pre-populated in the appropriate fields by merchant website 131. In this example, owner of mobile device 180 simply needs to select a link or button indicating an intent to complete the order without entering any additional information.

Alternatively, in an example where information for more than one billable financial account has been provided, mobile device owner may be able to select (e.g., via a drop down list or similar web page element) which one of the billable financial accounts should be used to complete the transaction. As such, owner of mobile device 180 may be able to select the billable financial account and complete the transaction without entering any additional information or, at most, limited information.

The pre-populated information may include masked information. For example, the billable financial account number may be masked by asterisks, except for the last four digits, as a means to protect the information. Additionally, the web page may include a blank field in which the owner of mobile device 180 must include the last four digits of the social security number of the owner. Merchant website 131, upon receiving the order confirmation, can compare the four digits entered by the mobile device owner with the four digits received as part of the customer information from the carrier identify server 128 to confirm the mobile device owner's identity and ability to utilize the information. In this way, the owner of mobile device 180 can securely and easily complete an online order using mobile device 180 with little or no entering of personal information.

Over time, encryption keys may be broken. To enhance security, encryption keys stored in encryption key database 221 are updated on a regular basis (e.g., every week). In step 230, encryption key database updates a corresponding encryption key related to a mobile subscriber account record identifier. As part of step 230, encryption key database generates a new HMAC of the mobile subscriber account record identifier utilizing the new encryption key and updates the unique ID database 222 with the new HMAC (new unique ID). The unique ID database 222, in turn, stores the new HMAC in its record for the corresponding mobile subscriber account record identifier, i.e. the record for the MDN in our example. In an example, if the encryption key is updated more frequently (e.g., each day or every hour), encryption key database 221 may maintain one or more of the most recent prior encryption key(s) and unique ID database 222 may maintain one or more of the most recent prior unique ID(s) such that, if a request is made based on the prior encryption key just prior to an update, the request may still be successful.

Figure 3:
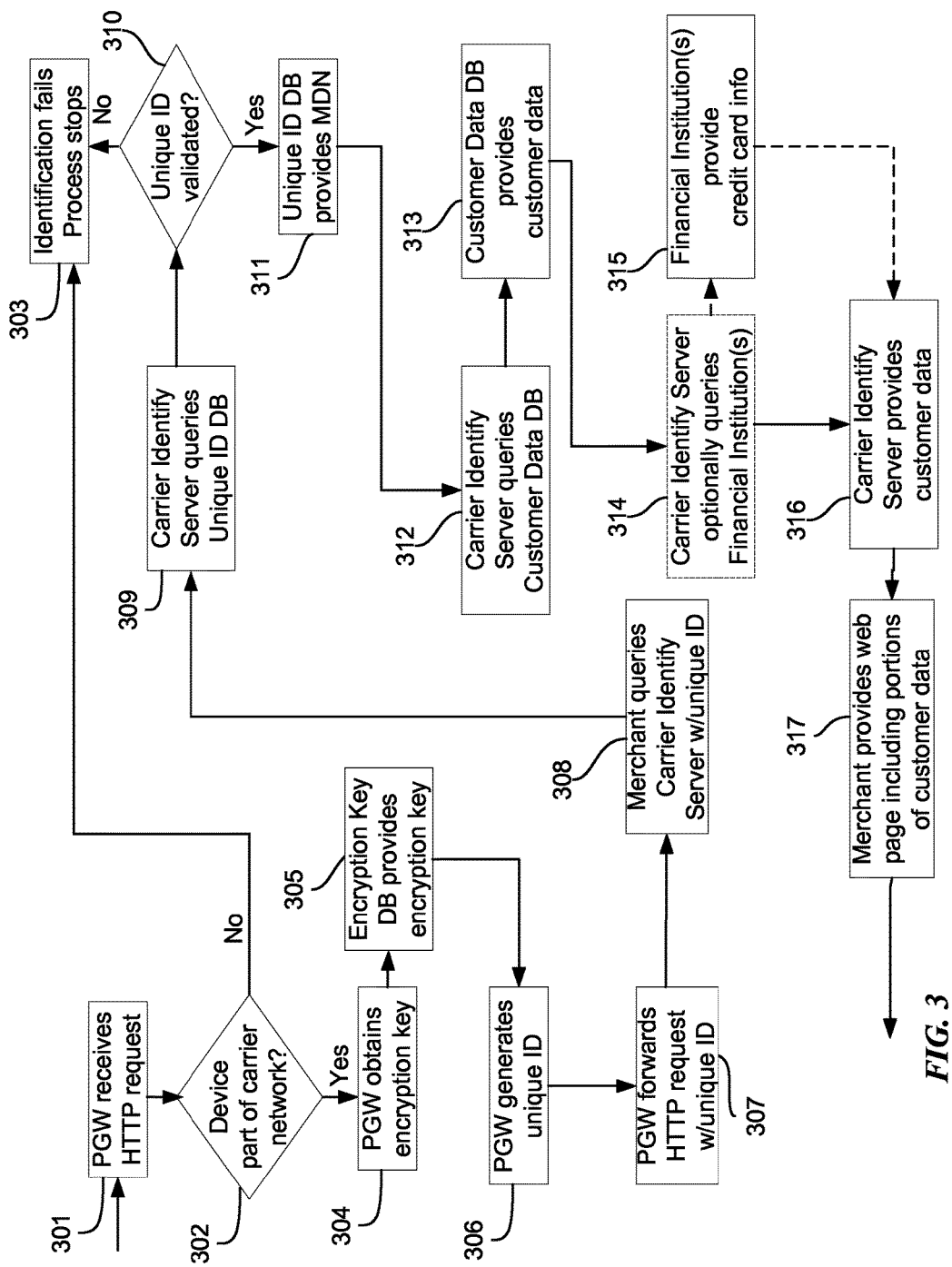
FIG. 3 is a flow diagram of an example of a process for identifying a transaction originator in a payment solution as implemented by the system represented in FIGS. 1 and 2.

FIG. 3 is a flow diagram of an example of a process for identifying a transaction originator in a payment solution as implemented by the system represented in FIGS. 1 and 2.

The process begins, in this example, when the PGW 123 receives an HTTP request at step 301. The HTTP request represents, for example, a request for a web page from mobile device 180 to merchant website 131. In one example, the requested web page is a check-out or order confirmation page prompting a user of mobile device 180 to verify personal information (e.g., name, street address, phone number and billing account) and submit an order for processing.

At decision step 302, it is determined if mobile device 180 is part of mobile communication network 120. For example, is the owner of mobile device 180 a customer of the operator of mobile communication network 120 or not. If the owner of mobile device 180 is not a customer of mobile communication network 120, the identification fails and the automated identification process stops at step 303. In such a situation, the PGW 123 may pass the request to the merchant website 131 without a unique identifier for the subscriber. In response, the merchant website 131 could respond with a web page asking for manual user input of the requisite information in a traditional manner. If the owner of mobile device 180 is a customer, the process continues to step 304.

Assuming in step 302 that the mobile device 180 belongs to a subscriber of the carrier's network service, then, in step 304, PGW 123 determines a mobile subscriber account record identifier related to mobile device 180 and requests a corresponding encryption key from the encryption key database 221. The mobile subscriber account record identifier is, for example, a mobile directory number (MDN) or mobile telephone number (MTN) of the mobile device 180. In this example, the encryption key request includes the MDN of mobile device 180.

In step 305, the encryption key database 221 receives the encryption key request and finds the corresponding encryption key based on the MDN (e.g., encryption key corresponding to MDN). The encryption key database 221 then provides the encryption key to PGW 123.

PGW 123, at step 306, utilizes the encryption key and the MDN to generate a unique ID related to the mobile device 180. In one example, PGW 123 utilizes the encryption key to generate an HMAC of the MDN. The PGW 123 then inserts the unique ID into the HTTP request and forwards the HTTP request with the unique ID to merchant website 131. For example, PGW 123 inserts the unique ID into an HTTP header of the HTTP request.

Merchant website 131 receives the HTTP request and extracts the unique ID as part of step 308. The merchant website 131 then queries, as part of step 308, a customer information mediation server for the customer information related to the received unique ID. The customer information mediation server is, for example, a carrier identify server 128.

The carrier identify server 128, in step 309, receives the unique ID from merchant website 131 and requests the MDN corresponding to the unique ID from unique ID database 222. The carrier identify server 128, for example, submits the HMAC of the MDN to unique ID database 222.

In step 310, the unique ID database 222 validates the unique ID sent as part of the request from carrier identify server 128. In one example, unique ID database 222 utilizes the unique ID as an index into the database and unique ID database 222 validates the unique ID provided in the query from the carrier identify server 128 by determining if the provided unique ID matches a unique ID stored in the database. If a record with a matching unique ID is not found, the provided unique ID is not validated, in which case identification fails and the automatic identification process stops in step 303. In such a situation, the carrier identify server 128 may pass a failure notice to the merchant website 131 without customer information for the subscriber. In response, the merchant website 131 could respond with a web page asking for manual user input of the requisite information in a traditional manner. If a record with a matching unique ID is found, the provided unique ID is validated, in which case the unique ID database 222 provides the MDN corresponding to the unique ID to the carrier identify server 128 in step 311.

Continuing the example, carrier identify server 128 requests customer information related to the owner of the mobile device 180 from customer account record database 223, in step 312, based on the MDN received from the unique ID database 222. Carrier identify server 128, for example, sends the MDN received from unique ID database 222 to customer account record database 223. The customer account record database 223, in step 313, uses the MDN to find the corresponding mobile subscriber account record. For example, the customer account record database 223 uses the MDN to find the record corresponding to the owner of the mobile device 180. Once customer account record database 223 finds the corresponding record, the customer account record database 223 provides the customer information in the record to the carrier identify server 128. The customer information includes, in this example, the full name of the owner of mobile device 180, a street address of the owner, a phone number of the owner, and the last four digits of the owner's social security number. Customer account record database 223 may provide all or portions of customer information as described above in relation to FIG. 2.

In optional step 314, the carrier identify server 128 may also query one or more financial institution(s) 132 to determine billable financial account information based on the MDN. In this optional step, for example, carrier identify server 128 provides one or more financial institution(s) 132 with the MDN of mobile device 180 in order to acquire information for one or more billable financial account(s). In optional step 315, the one or more financial institution(s) 132 use the mobile subscriber account record identifier to determine billable financial account information related to the owner of mobile device 180. The billable financial account information includes an account number (e.g. credit/debit card number), an account expiry data (e.g. expiration month and year), and an account type data (e.g. MasterCard, Visa, American Express, etc.) In this example, the one or more financial institution(s) 132 use the MDN to determine one or more credit/debit account(s) related to the owner of mobile device 180. Alternatively, as described above in relation to FIG. 2, customer account record database 223 may include other financial institution information (e.g., mobile device owner's credentials for the financial institution) in order to complete the optional query and/or customer account record database 223 may directly contain billable financial account information related to the owner of the mobile device 180. The billable financial account information is then provided to the carrier identify server 128.

Carrier identify server 128, in the examples, provides the customer information and, optionally, billable financial account information to the merchant(s) 131, in step 316. In step 317, merchant(s) 131 provides portions of the customer information, for example, as part of the check-out or order confirmation web page, without requiring the owner of the mobile device to log into the merchant website and without utilizing the cache of the web browser. In one example, the web page includes the owner's name, street address, and phone number as well as the billable financial account information (e.g. credit/debit card number, expiry data, and card type data). In this example, however, all except the last four digits of the account number are masked (e.g., displayed as an asterisk). Additionally, the web page may include a blank field requesting the owner to provide the last four digits of the owner's social security number. When the merchant 131 receives the submitted web page, the merchant 131 may compare the four digits provided by the owner with the four digits provided by the carrier identify server 128 as further confirmation of the owner's identity.

The process of identifying a transaction originator in an on-line commercial transaction has been described, by way of example only. Although the examples have focused on a check-out process, this is for simplicity only. Such transaction originator identification process may also be used in establishing an account and/or for verifying an identity, as well as other transactions (e.g., bill payment, banking, etc.).

As shown by the above discussion, functions relating to an identification of a transaction originator in an on-line commercial transaction process may be implemented on computers connected for data communication via the components of a packet data network, operating as a carrier identify server 128 and/or as a merchant 131 as shown in FIG. 1. Although special purpose devices may be used, such devices also may be implemented using one or more hardware platforms intended to represent a general class of data processing device commonly used to run "server" programming so as to implement the transaction originator identification functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the encryption key database 221, unique ID database 222 and/or customer account record database 223. The software code is executable by the general-purpose computer that functions as the carrier identify server 128, PGW 123 or the carrier database system 129. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for identifying a transaction originator in a payment solution, in essentially the manner performed in the implementations discussed and illustrated herein.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication (see FIG. 4). The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. A packet gateway may be implemented on somewhat similar hardware, although aspects of the gateway hardware may be enhanced or optimized to handle routing of a high volume of traffic through the platform.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of identifying a transaction originator in a payment solution outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the packet gateway 123, the carrier database system 129, the carrier identify server 128 and/or the computer platform of the merchant that will be the merchant server 131. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the carrier database system 129, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a customer information mediation device comprising:
a memory; and
a processor connected to the memory,
the customer information mediation device being configured to:
receive, from a merchant device via a data communication interface, a unique identifier related to a mobile device based on the mobile device being associated with a subscriber of a particular mobile communication network,
the merchant device being different from the mobile device,
the merchant device being associated with a merchant website, and
the customer information mediation device being associated with the particular mobile communication network;
send a first request, to a unique identifier database via the data communication interface, for a mobile subscriber account record identifier that corresponds to the unique identifier,
the mobile subscriber account record identifier identifying a mobile subscriber account record of the subscriber, and
the unique identifier database being associated with the particular mobile communication network;
obtain, from the unique identifier database via the data communication interface, the mobile subscriber account record identifier based on the unique identifier matching a stored unique identifier in the unique identifier database;
send a second request, to a customer database via the data communication interface, for customer information associated with the subscriber based on obtaining the mobile subscriber account record identifier,
the customer database storing subscriber account records of customers subscribed for service by the particular mobile communication network;
obtain, from the customer database via the data communication interface, the customer information based on the customer information corresponding to the mobile subscriber account record identifier; and
provide, to the merchant device via the data communication interface, the customer information and financial account information associated with the subscriber,
the customer information and the financial account information being provided as part of a check-out webpage or an order confirmation webpage without requiring the subscriber to log into the merchant website and without utilizing cache of a web browser.

2. The system of claim 1, wherein the unique identifier is extracted from an HTTP request,
the unique identifier being in a HTTP header field of the HTTP request.

3. The system of claim 1, wherein:
the unique identifier is a keyed-hash message authentication code of the mobile subscriber account record identifier.

4. The system of claim 1, wherein the customer information includes at least one or more of:
a name of the subscriber;
a street address of the subscriber;
a phone number of the subscriber; or
last four digits of a social security number of the subscriber.

5. The system of claim 1, wherein the customer information mediation device is further configured to:
obtain, from at least one computer platform of a financial institution and based on the mobile subscriber account record identifier, the financial account information.

6. The system of claim 5, wherein the financial account information comprises at least one or more of:
a billable account number;
a billable account expiry data; or
a billable account type data.

7. The system of claim 5, wherein the financial account information comprises:
at least two billable account numbers;
at least one billable account expiry data for each billable account number; and
at least one billable account type data for each billable account number.

8. The system of claim 1, wherein the customer information mediation device is further configured to:
provide the unique identifier to at least one computer platform of a financial institution; and
obtain, from the at least one computer platform of the financial institution based on providing the unique identifier, the financial account information.

9. A non-transitory computer readable medium storing instructions, the instructions comprising:
one or more instructions which, when executed by one or more processors, cause the one or more processors to:
receive, from a merchant device via a data communication interface, a unique identifier related to a mobile device based on the mobile device being associated with a subscriber of a particular mobile communication network,
the merchant device being different from the mobile device, and
the merchant device being associated with a merchant website;
send a first request, to a unique identifier database via the data communication interface, for a mobile subscriber account record identifier that corresponds to the unique identifier,
the mobile subscriber account record identifier identifying a mobile subscriber account record of the subscriber, and
the unique identifier database being associated with the particular mobile communication network;
obtain, from the unique identifier database via the data communication interface, the mobile subscriber account record identifier based on the unique identifier matching a stored unique identifier in the unique identifier database;
send a second request, to a customer database via the data communication interface, for customer information associated with the subscriber based on obtaining the mobile subscriber account record identifier,
the customer database storing subscriber account records of customers subscribed for service by the particular mobile communication network;
obtain, from the customer database via the data communication interface, the customer information based on the customer information corresponding to the mobile subscriber account record identifier; and
provide, to the merchant device via the data communication interface, the customer information and financial account information associated with the subscriber,
the customer information and the financial account information being provided as part of a check-out webpage or an order confirmation webpage without requiring the subscriber to log into the merchant website and without utilizing cache of a web browser.

10. The non-transitory computer readable medium of claim 9, wherein the unique identifier is a keyed-hash message authentication code of the mobile subscriber account record identifier.

11. The non-transitory computer readable medium of claim 9, wherein the customer information includes at least one or more of:
a name of the subscriber;
a street address of the subscriber;
a phone number of the subscriber; or
last four digits of a social security number of the subscriber.

12. The non-transitory computer readable medium of claim 9, wherein the one or more instructions, when executed by the one or more processors, further cause the one or more processors to:
obtain, from at least one computer platform of a financial institution and based on the mobile subscriber account record identifier, the financial account information.

13. The non-transitory computer readable medium of claim 12, wherein the financial account information comprises at least one or more of:
a billable account number;
a billable account expiry data; or
a billable account type data.

14. The non-transitory computer readable medium of claim 12, wherein the financial account information comprises:
at least two billable account numbers;
at least one billable account expiry data for each billable account number; and
at least one billable account type data for each billable account number.

15. The non-transitory computer readable medium of claim 9, wherein the one or more instructions, when executed by the one or more processors, further cause the one or more processors to:
provide the unique identifier to at least one computer platform of a financial institution; and
obtain, from the at least one computer platform of the financial institution based on providing the unique identifier, the financial account information.

16. A method, comprising:
receiving, by a customer information mediation device and from a merchant device via a data communication interface, a unique identifier related to a mobile device based on the mobile device being associated with a subscriber of a particular mobile communication network, the merchant device being different from the mobile device, the merchant device being associated with a merchant website, and the customer information mediation device being associated with the particular mobile communication network;

sending, by the customer information mediation device via the data communication interface, a first request to a unique identifier database for a mobile subscriber account record identifier that corresponds to the unique identifier, the mobile subscriber account record identifier identifying a mobile subscriber account record of the subscriber, and the unique identifier database being associated with the particular mobile communication network;

obtaining, by the customer information mediation device and from the unique identifier database via the data communication interface, the mobile subscriber account record identifier based on the unique identifier matching a stored unique identifier in the unique identifier database;

sending, by the customer information mediation device via the data communication interface, a second request to a customer database for customer information associated with the subscriber based on obtaining the mobile subscriber account record identifier, the customer database storing subscriber account records of customers subscribed for service by the particular mobile communication network;

obtaining, by the customer information mediation device and from the customer database via the data communication interface, the customer information based on the customer information corresponding to the mobile subscriber account record identifier; and providing, by the customer information mediation device and to the merchant device via the data communication interface, the customer information and financial account information associated with the subscriber, the customer information and the financial account information being provided as part of a check-out webpage or an order confirmation webpage without requiring the subscriber to log into the merchant website and without utilizing cache of a web browser.

17. The method of claim 16, where the unique identifier is extracted from an HTTP request, the unique identifier being in a HTTP header field of the HTTP request.

18. The method of claim 16, where, the unique identifier is a keyed-hash message authentication code of the mobile subscriber account record identifier of the mobile device.

19. The method of claim 16, wherein the customer information includes at least one or more of:

a name of the subscriber;

a street address of the subscriber;

a phone number of the subscriber; or last four digits of a social security number of the subscriber.

20. The method of claim 16, further comprising:

obtaining, by the customer information mediation device from at least one computer platform of a financial institution and based on the mobile subscriber account record identifier, the financial account information.

\* \* \* \* \*